(12) United States Patent
Yamamoto et al.

(10) Patent No.: US 10,816,965 B2
(45) Date of Patent: Oct. 27, 2020

(54) MANUFACTURING FACILITY MANAGEMENT OPTIMIZATION DEVICE

(71) Applicant: Hitachi, Ltd., Chiyoda-ku, Tokyo (JP)

(72) Inventors: Hiroki Yamamoto, Tokyo (JP); Masaaki Mukaide, Tokyo (JP); Yoshinari Hori, Tokyo (JP); Takeshi Terasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 16/079,912

(22) PCT Filed: Mar. 2, 2017

(86) PCT No.: PCT/JP2017/008364
§ 371 (c)(1),
(2) Date: Aug. 24, 2018

(87) PCT Pub. No.: WO2017/154744
PCT Pub. Date: Sep. 14, 2017

(65) Prior Publication Data
US 2019/0064790 A1    Feb. 28, 2019

(30) Foreign Application Priority Data

Mar. 11, 2016  (JP) ................................. 2016-047756

(51) Int. Cl.
*G05B 23/02*    (2006.01)
*G06Q 50/04*    (2012.01)
(Continued)

(52) U.S. Cl.
CPC ....... *G05B 23/0294* (2013.01); *G05B 19/418* (2013.01); *G05B 23/024* (2013.01);
(Continued)

(58) Field of Classification Search
CPC .............. G05B 23/0294; G05B 19/418; G05B 23/0254; G05B 23/024; G06Q 10/08;
(Continued)

(56) References Cited

U.S. PATENT DOCUMENTS

| 8,000,819 B2 * | 8/2011 | Hanawa ............. G06Q 10/0633 |
| | | 700/91 |
| 2004/0148047 A1 * | 7/2004 | Dismukes ........ G05B 19/41865 |
| | | 700/100 |

(Continued)

FOREIGN PATENT DOCUMENTS

| JP | 2004-234536 A | 8/2004 |
| JP | 2007-183929 A | 7/2007 |

(Continued)

OTHER PUBLICATIONS

International Search Report (PCT/ISA/210) issued in PCT Application No. PCT/JP2017/008364 dated May 16, 2017 with English translation (four (4) pages).

(Continued)

*Primary Examiner* — Kenneth M Lo
*Assistant Examiner* — Mohammed Shafayet
(74) *Attorney, Agent, or Firm* — Crowell & Moring LLP

(57) ABSTRACT

This manufacturing facility management optimization device: on the basis of an operation condition of a manufacturing facility, creates, in a simulated manner in time series, an operation state which includes a measurement value, product yield, and quantities of raw materials consumed, of the manufacturing facility; detects an anomaly from the created operation state; identifies maintenance which corresponds to the detected anomaly, corrects the operation condition on the basis of the identified maintenance, and creates a plurality of post-correction operation condition candidates; creates, in a simulated manner in time (Continued)

series, a plurality of post-correction operation state candidates on the basis of the plurality of post-correction operation condition candidates; on the basis of the product yield and the quantities of raw materials consumed in the plurality of pre- and post-correction operation state candidates, and a unit price, creates a management index for the operation state and each of the plurality of post-correction operation state candidates; and, from among the plurality of post-correction operation condition candidates, identifies the candidate which optimizes the management index.

5 Claims, 14 Drawing Sheets

(51) Int. Cl.
G05B 19/418 (2006.01)
G06Q 10/06 (2012.01)
G06Q 10/08 (2012.01)
G06Q 10/10 (2012.01)

(52) U.S. Cl.
CPC ... *G05B 23/0254* (2013.01); *G06Q 10/06395* (2013.01); *G06Q 10/08* (2013.01); *G06Q 50/04* (2013.01); *G06Q 10/06315* (2013.01); *Y02P 90/02* (2015.11); *Y02P 90/30* (2015.11); *Y02P 90/80* (2015.11)

(58) Field of Classification Search
CPC ........ G06Q 10/06; G06Q 10/10; G06Q 50/04; G06Q 10/06395; G06Q 10/06315; Y02P 90/86; Y02P 90/30; Y02P 90/02
USPC ........................................ 700/108
See application file for complete search history.

(56) References Cited

U.S. PATENT DOCUMENTS

| | | | | |
|---|---|---|---|---|
| 2005/0119863 A1* | 6/2005 | Buikema | ............ | G05B 19/4184 702/188 |
| 2006/0282186 A1* | 12/2006 | Hansen | ................ | G05B 13/024 700/97 |
| 2007/0271039 A1* | 11/2007 | Ella | ......................... | G06Q 50/06 702/12 |
| 2009/0063251 A1* | 3/2009 | Rangarajan | ...... | G06Q 10/06375 705/7.31 |
| 2010/0076809 A1* | 3/2010 | Eryurek | .................. | G05B 15/02 702/182 |
| 2010/0286798 A1* | 11/2010 | Keyes | .................. | G05B 13/042 700/29 |
| 2010/0293019 A1* | 11/2010 | Keyes | .................. | G05B 13/042 705/7.29 |
| 2012/0083914 A1* | 4/2012 | Kocis | ....................... | G06F 30/20 700/100 |
| 2012/0290104 A1* | 11/2012 | Holt | ....................... | G06Q 10/00 700/29 |
| 2013/0268238 A1* | 10/2013 | McCready | ........... | G05B 23/024 702/179 |

FOREIGN PATENT DOCUMENTS

| | | |
|---|---|---|
| JP | 2008-146306 A | 6/2008 |
| JP | 2010-237893 A | 10/2010 |
| JP | 2012-238308 A | 12/2012 |
| JP | 2014-96025 A | 5/2014 |

OTHER PUBLICATIONS

Japanese-language Written Opinion (PCT/ISA/237) issued in PCT Application No. PCT/JP2017/008364 dated May 16, 2017 (three (3) pages).

* cited by examiner

FIG.3

| TIMEPOINT | t1 | t2 | t3 | t4 | t5 | t6 |
|---|---|---|---|---|---|---|

OPERATING CONDITIONS ～X

| | | t1 | t2 | t3 | t4 | t5 | t6 |
|---|---|---|---|---|---|---|---|
| CRUDE OIL | INTRODUCTION QUANTITY | ·· | ·· | ·· | ·· | ·· | ·· |
| | LIGHT OIL RATIO | ·· | ·· | ·· | ·· | ·· | ·· |
| PRE-FLASH COLUMN | HEATING FURNACE PRESSURE | ·· | ·· | ·· | ·· | ·· | ·· |
| | HEATING FURNACE TEMPERATURE | ·· | ·· | ·· | ·· | ·· | ·· |
| | STEAM FLOW RATE | ·· | ·· | ·· | ·· | ·· | ·· |
| | STEAM PRESSURE | ·· | ·· | ·· | ·· | ·· | ·· |
| | STEAM TEMPERATURE | ·· | ·· | ·· | ·· | ·· | ·· |
| | NUMBER OF STAGES | ·· | ·· | ·· | ·· | ·· | ·· |
| ATMOSPHERIC DISTILLATION COLUMN | HEATING FURNACE PRESSURE | ·· | ·· | ·· | ·· | ·· | ·· |
| | STEAM FLOW RATE | ·· | ·· | ·· | ·· | ·· | ·· |
| | STEAM PRESSURE | ·· | ·· | ·· | ·· | ·· | ·· |
| | STEAM TEMPERATURE | ·· | ·· | ·· | ·· | ·· | ·· |
| | NUMBER OF STAGES | ·· | ·· | ·· | ·· | ·· | ·· |
| ⋮ | | | | | | | |

OPERATING STATES ～Y

| | | t1 | t2 | t3 | t4 | t5 | t6 |
|---|---|---|---|---|---|---|---|
| OUTPUT QUANTITY | GASOLINE | ·· | ·· | ·· | ·· | ·· | ·· |
| | HEAVY OIL | ·· | ·· | ·· | ·· | ·· | ·· |
| | KEROSENE | ·· | ·· | ·· | ·· | ·· | ·· |
| CONSUMPTION AMOUNT OF ELECTRIC POWER | | ·· | ·· | ·· | ·· | ·· | ·· |
| CONSUMPTION AMOUNT OF CONSUMABLES | FUEL | ·· | ·· | ·· | ·· | ·· | ·· |
| | STEAM | ·· | ·· | ·· | ·· | ·· | ·· |
| | HYDROGEN | ·· | ·· | ·· | ·· | ·· | ·· |
| TEMPERATURE | FIRST STAGE OF ATMOSPHERIC DISTILLATION COLUMN | ·· | ·· | ·· | ·· | ·· | ·· |
| | SECOND STAGE OF ATMOSPHERIC DISTILLATION COLUMN | ·· | ·· | ·· | ·· | ·· | ·· |
| | THIRD STAGE OF ATMOSPHERIC DISTILLATION COLUMN | ·· | ·· | ·· | ·· | ·· | ·· |
| | FOURTH STAGE OF ATMOSPHERIC DISTILLATION COLUMN | ·· | ·· | ·· | ·· | ·· | ·· |
| PRESSURE | PRE-FLASH COLUMN | ·· | ·· | ·· | ·· | ·· | ·· |
| | ATMOSPHERIC DISTILLATION COLUMN | ·· | ·· | ·· | ·· | ·· | ·· |
| | REDUCED-PRESSURE DISTILLATION COLUMN | ·· | ·· | ·· | ·· | ·· | ·· |
| ⋮ | | | | | | | |

MANAGEMENT INDICES ～Z

| | t1 | t2 | t3 | t4 | t5 | t6 |
|---|---|---|---|---|---|---|
| INCOME | ·· | ·· | ·· | ·· | ·· | ·· |
| EXPENDITURE | ·· | ·· | ·· | ·· | ·· | ·· |
| ORDINARY PROFIT | ·· | ·· | ·· | ·· | ·· | ·· |

FIG.4

| TIMEPOINT | t1 | t2 | t3 | t4 | t5 | t6 |
|---|---|---|---|---|---|---|

OPERATING CONDITIONS ~ Xd

| | | t1 | t2 | t3 | t4 | t5 | t6 |
|---|---|---|---|---|---|---|---|
| CRUDE OIL | INTRODUCTION QUANTITY | .. | .. | .. | .. | .. | .. |
| | LIGHT OIL RATIO | .. | .. | .. | .. | .. | .. |
| PRE-FLASH COLUMN | HEATING FURNACE PRESSURE | .. | .. | .. | ** | ** | ** |
| | HEATING FURNACE TEMPERATURE | .. | .. | .. | ** | ** | ** |
| | STEAM FLOW RATE | .. | .. | .. | ** | ** | ** |
| | STEAM PRESSURE | .. | .. | .. | ** | ** | ** |
| | STEAM TEMPERATURE | .. | .. | .. | ** | ** | ** |
| | NUMBER OF STAGES | .. | .. | .. | .. | .. | .. |
| ATMOSPHERIC DISTILLATION COLUMN | HEATING FURNACE PRESSURE | .. | ** | ** | ** | ** | ** |
| | STEAM FLOW RATE | .. | ** | ** | ** | ** | ** |
| | STEAM PRESSURE | .. | ** | ** | ** | ** | ** |
| | STEAM TEMPERATURE | .. | ** | ** | ** | ** | ** |
| | NUMBER OF STAGES | .. | .. | .. | .. | .. | .. |
| ⋮ | | | | | | | |

MAINTENANCE ~ M

| | t1 | t2 | t3 | t4 | t5 | t6 |
|---|---|---|---|---|---|---|
| CLEANING OF HEAT EXCHANGER AT DOWNSTREAM OF HEATING FURNACE OF PRE-FLASH COLUMN | | 72 | | EXECUTION ~71 | | |
| REPLACEMENT OF STEAM TEMPERATURE SENSOR OF ATMOSPHERIC DISTILLATION COLUMN | | EXECUTION | | | | |

OPERATING STATES ~ Yd

| | | t1 | t2 | t3 | t4 | t5 | t6 |
|---|---|---|---|---|---|---|---|
| OUTPUT QUANTITY | GASOLINE | .. | ## | ## | bb | bb | bb |
| | HEAVY OIL | .. | ## | ## | bb | bb | bb |
| | KEROSENE | .. | ## | ## | bb | bb | bb |
| CONSUMPTION AMOUNT OF ELECTRIC POWER | | .. | ## | ## | bb | bb | bb |
| CONSUMPTION AMOUNT OF CONSUMABLES | FUEL | .. | ## | ## | bb | bb | bb |
| | STEAM | .. | ## | ## | bb | bb | bb |
| | HYDROGEN | .. | ## | ## | bb | bb | bb |
| TEMPERATURE | FIRST STAGE OF ATMOSPHERIC DISTILLATION COLUMN | .. | ## | ## | bb | bb | bb |
| | SECOND STAGE OF ATMOSPHERIC DISTILLATION COLUMN | .. | ## | ## | bb | bb | bb |
| | THIRD STAGE OF ATMOSPHERIC DISTILLATION COLUMN | .. | ## | ## | bb | bb | bb |
| | FOURTH STAGE OF ATMOSPHERIC DISTILLATION COLUMN | .. | ## | ## | bb | bb | bb |
| PRESSURE | PRE-FLASH COLUMN | .. | ## | ## | bb | bb | bb |
| | ATMOSPHERIC DISTILLATION COLUMN | .. | ## | ## | bb | bb | bb |
| | REDUCED-PRESSURE DISTILLATION COLUMN | .. | ## | ## | bb | bb | bb |
| ⋮ | | | | | | | |

MANAGEMENT INDICES ~ Zd

| | t1 | t2 | t3 | t4 | t5 | t6 |
|---|---|---|---|---|---|---|
| INCOME | .. | *** | *** | *** | *** | *** |
| EXPENDITURE | .. | *** | *** | *** | *** | *** |
| ORDINARY PROFIT | .. | *** | *** | *** | *** | *** |

MANUFACTURING FACILITY MANAGEMENT OPTIMIZATION DEVICE

TECHNICAL FIELD

The present invention relates to a manufacturing facility management optimization device.

BACKGROUND ART

Demand for fields related to manufacturing and refining petroleum and gas, and to manufacturing chemicals is expected to keep growing in the future. However, since market conditions continuously fluctuate, such as a decline in petroleum prices in recent years, it is difficult to manage plants in such fields. In addition, some plants have problems of maintenance and updating of facilities required due to the aging of facilities, improvement of safety consciousness, transfer of manufacturing know-how because of the aging of human resources, and the like. The managers of plants are required to improve the management efficiency while dealing with such problems.

In order to solve such problems, plant control technologies for detecting abnormalities of a plant by effectively utilizing plant operation data have been proposed. Many of these plant control technologies use the Internet of Things (IoT) technology and the like.

The abnormality diagnosis device disclosed in PTL 1 acquires measurement data of a plant as a sample and classifies the data into a plurality of normal categories and a plurality of abnormal categories. Then, when classifying the measurement data acquired from the plant to be diagnosed into one of those categories, the abnormality diagnosis device takes the appearance frequency for each category into consideration to improve the diagnostic accuracy.

The device for assisting generating fuel disclosed in PTL 2 calculates the amounts of electric power, fuel, chemicals, and the like required for carbonizing organic resources (food factory waste and the like) to calculate their costs.

The equipment maintenance planning device disclosed in PTL 3 takes correlation between components into consideration when preparing maintenance plans of many components constituting a plant. Thus, it is possible to reduce maintenance costs by, for example, simultaneously maintaining components having similar positional relationships and similar failure cycles.

CITATION LIST

Patent Literature

PTL 1: JP 2010-237893 A
PTL 2: JP 2008-146306 A
PTL 3: JP 2007-183929 A

SUMMARY OF INVENTION

Technical Problem

To manage a plant, it is important to be able to compare the detail of maintenance on site with its influence on the management as a whole in each case. This makes it possible for on-site workers and managers together to determine that, for example, unnecessary maintenance is to be interrupted to increase profits, some of increased profits is to be used for truly necessary maintenance, and the like.

The abnormality diagnosis device disclosed in PTL 1 is based on the assumption that an on-site maintenance worker finds an abnormality of a plant, and does not consider how the maintenance for the abnormality affects the management of the plant.

The device for assisting generating fuel disclosed in PTL 2 has a certain effect in calculating the cost, but lacks the idea of thinking performing maintenance while paying attention to abnormalities of the plant and the cost for the maintenance in association with each other.

The equipment maintenance planning device disclosed in PTL 3 does not make it easy to understand the cause-and-effect relationship between the detail of the maintenance plans and the cost.

Thus, the present invention is to determine the economic efficiency by on-site workers and managers together in order to operate a manufacturing facility such as a plant.

Solution to Problem

A manufacturing facility management optimization device according to the present invention includes a storage unit that stores unit prices of a product manufactured by a manufacturing facility and a raw material consumed by the manufacturing facility, a simulation unit that simulatively generates, based on an operating condition of the manufacturing facility, an operating state including a measurement value of the manufacturing facility, an output quantity of the product, and a consumption amount of the raw material in time series, a diagnosis unit that detects an abnormality from the generated operating state, a maintenance proposal unit that specifies maintenance corresponding to the detected abnormality, corrects the operating condition based on the specified maintenance, and generates a plurality of candidates for the corrected operating condition, a re-simulation unit that simulatively generates, based on the plurality of candidates for the corrected operating condition, a plurality of candidates for the corrected operating state including the measurement value of the manufacturing facility, the output quantity of the product, and the consumption amount of the raw material in time series, an economic-efficiency evaluation unit that generates a management index for each of the operating state and the plurality of candidates for the corrected operating state based on the output quantity of the product and the consumption amount of the raw material in the operating state, the output quantity of the product and the consumption amount of the raw material in the plurality of candidates for the corrected operating state, and the unit prices, and an economic-efficiency optimization unit that specifies a candidate that optimizes the management index from the plurality of candidates for the corrected operating condition.

Other means will be explained in Description of Embodiment.

Advantageous Effects of Invention

According to the present invention, it is possible for on-site workers and managers together to determine the economic efficiency in order to operate a manufacturing facility such as a plant.

BRIEF DESCRIPTION OF DRAWINGS

FIG. 3 is specific examples of operating conditions, operating states, and management indices.

FIG. 4 is specific examples of operating conditions, maintenance, operating states, and management indices.

DESCRIPTION OF EMBODIMENT

Hereinafter, a mode for carrying out the present invention (referred to as "the present embodiment") is described in detail with reference to the drawings and the like. The example described in the present embodiment is an example of a petroleum refining plant. However, the present invention is not limited to petroleum refining plants but is also applicable to chemical plants, electric power plants, water treatment plants, pharmaceutical manufacturing plants, and the like. Furthermore, the present invention can be applied to facilities that generally manufacture products including electric power regardless of the name "plant".

(Petroleum Refining Plant)

Figure 1:
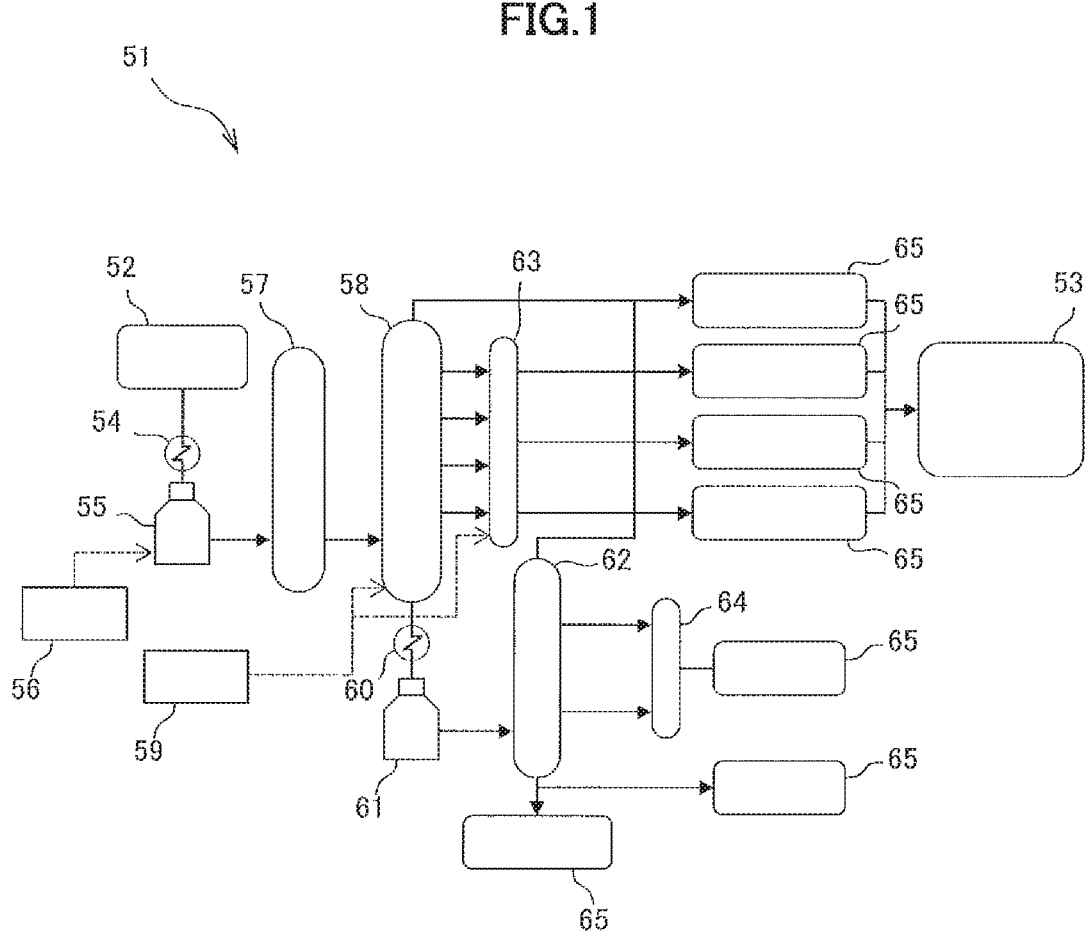
FIG. 1 is a schematic diagram of a petroleum refining plant.

With reference to FIG. 1, a schematic diagram of a petroleum refining plant 51 is described. The schematic diagram also explains the flow of raw materials and products. The petroleum refining plant 51 is, roughly speaking, a large-scale manufacturing facility that manufactures petroleum products 53 using crude oil 52 as a raw material. The petroleum products 53 are divided into gas and liquid, and the liquid is further divided into naphtha, kerosene, light oil, heavy oil, and the like depending on the difference in boiling points.

The crude oil 52 as a raw material is preheated by a heat exchanger 54 and then heated by a heating furnace 55. Heating fuel 56 is supplied to the heating furnace 55. The crude oil discharged from the heating furnace 55 is flowed to an atmospheric distillation column 58 after light gas components are removed in a pre-flash column 57. Steam 59 is supplied to the atmospheric distillation column 58. In the atmospheric distillation column 58, the crude oil is separated into gas, naphtha, kerosene, light oil, and the like, and residue. The residue is preheated by a heat exchanger 60 and a heating furnace 61 and then flowed to a reduced-pressure distillation column 62. A part of the others is flowed to a steam stripper 63 to remove light components and inorganic components. The steam 59 is supplied to the steam stripper 63. In the reduced-pressure distillation column 62, light components are further removed from the residue, and coke and asphalt are refined. Furthermore, the heavy components (coke and asphalt) are lightened in a reforming device 64.

Each refined product is stored through hydrodesulfurization processing in a hydrogen purifier 65 and the like.

Sensors (not shown) are installed at many places such as equipment and piping constituting the petroleum refining plant. The sensors measure the temperatures, pressures, flow rates per unit time, and the like of the gas or liquid passing through the interior. The sensors also measure the temperature of the equipment itself. For example, a plurality of partition-like "stages" is arranged along the fluid flowing direction inside the atmospheric distillation column 58. Temperature sensors are installed at each of these stages.

Terms and Others

Operating conditions are set values for the equipment and the like constituting the plant. There are various operating conditions depending on the types of equipment and the like. For example, items such as "the volume of consumed crude oil per unit time", "the temperature of the heating furnace disposed immediately downstream of the atmospheric distillation column", "the pressure of steam supplied to the atmospheric distillation column", and the like can be the operating conditions. Each item can be represented in time series (at each timepoint). Thus, it can be said that, in general, the operating conditions are "a matrix (X)" in which the items are used as rows and the timepoints are used as columns, and it can be said that, in practice, the operating conditions are "the way of using the plant in itself".

Operating states are measurement values measured by the sensors installed at equipment, piping, and the like of the plant. There are various operating states depending on the types of equipment and the like. For example, items such as "the temperature of the first stage from the bottom of the atmospheric distillation column", "the temperature of the pre-flash column", "the mass of manufactured naphtha", "the amount of consumed electric power", and the like can be the operating states. Each item can be represented in time series (at each timepoint). Thus, it can be said that, in general, the operating states are "a matrix (Y)" in which the items are used as rows and the timepoints are used as columns, and it can be said that, in practice, the operating states are "the operation of the plant in itself".

Management indices are monetary indices related to raw material procurement, product sales, finance, and the like. Many of the management indices are common regardless of the types of plants. For example, items such as "income", "expenditure", "profit", "cumulative profit", and the like can be the management indices. Each item can be represented in time series (at each timepoint). Thus, it can be said that, in general, the management indices are a "matrix (Z) in which the items are used as rows and the timepoints are used as columns", and it can be said that, in practice, the management indices are "the economic efficiency of the plant in itself".

(Relationship Between Operating Condition, Operating State, and Management Index)

When an operating condition X is determined, an operating state Y is also determined. This relationship is represented as a function "$Y=f_1(X)$". When the operating state Y is determined and the unit prices of a product, consumed electric power, a raw material, and the like are determined, a management index Z is determined. The unit prices are a "matrix (P)" in which the types of products, consumed electric power, raw materials, and the like are used as rows and the timepoints are used as columns. Each element of unit prices P is the unit price of a product or the like at that timepoint.

This relationship is represented as a function "Z=$f_2$ (Y, P)". Incidentally, when "Y" in "$f_1$" and "$f_2$" is eliminated, "Z=F (X, P)" is obtained. That is, is a composite function of "$f_1$" and "$f_2$". In short, "Z=F (X, P)" indicates that "when the way of using the plant and the unit prices are determined, the economic efficiency of the plant is determined".

(Simulation)

The manufacturing facility management optimization device of the present embodiment (hereinafter, may be simply referred to as "the device") can simulatively output the operating state Y using the operating condition X set by a user as an input. That is, the device can use the function "Y=$f_1$ (X)". Furthermore, the device can automatically generate the operating condition X without waiting for the user to set the operating condition X, input the generated operating condition X, and simulatively output the operating state Y.

(Economic Efficiency Evaluation)

The device can output the management index Z using the operating state Y and the unit prices P as an input. That is, the device can use the function "Z=$f_2$ (Y, P)".

(Abnormality Diagnosis)

The device can classify the operating state Y into a plurality of categories using Adaptive resonance theory (ART). Since the categories are each associated with "normal" or "abnormal", the device can detect an abnormality in the operating state Y. Specifically, the device can perform the following processing.

(#1: Collection of Samples)

The device collects a plurality of samples of the operating state Y. The samples are a set of operating states Y when it is known that the plant is "normal" or "abnormal".

(#2: Classification of Samples)

Figure 2:
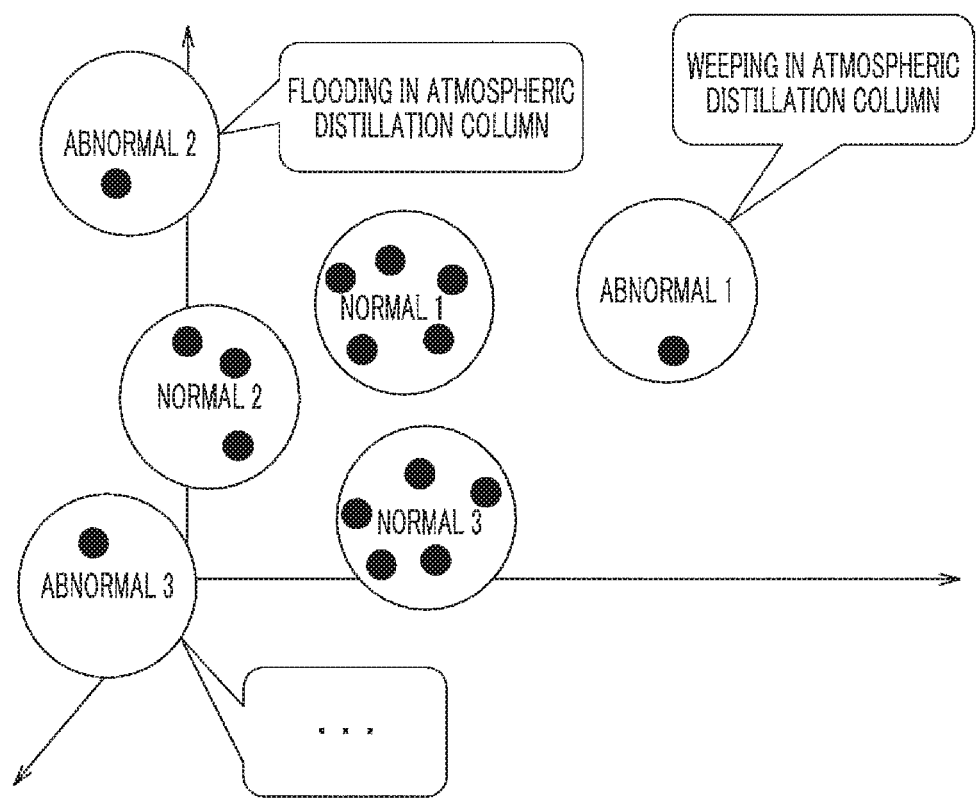
FIG. 2 is a diagram for explaining an n-dimensional space in Adaptive resonance theory.

The operating states Y are assumed to be a matrix of n rows×m columns. That is, the operating states Y have n dimensional elements at m timepoints. The device assumes an n-dimensional space and assigns the values of n elements to each coordinate axis of the space to mark with m points in the space. FIG. 2 is a diagram showing an example when the n-dimensional space described here is a three-dimensional space. Then, when an abnormality such as "flooding in the atmospheric distillation column" occurs, a plurality of points concentrates at a specific position in the space. As another example, when an abnormality such as "weeping in the atmospheric distillation column" occurs, a plurality of points concentrates at another specific position in the space. Naturally, when the plant is normal, the points indicating, for example, the same season in which the plant is used, or those who use the plant are the same gather in the vicinity.

Thus, in the device, m points are divided into groups having mutually close distances. The number of groups is not particularly limited, but each group corresponds to any one of the categories of "abnormality 1", "abnormality 2", "abnormality 3", . . . , "normal 1", "normal 2", "normal 3", Each category forms a "sphere" in the n-dimensional space. As long as the category is specified, the device can detect the detail of the abnormality such as "category abnormality 1=flooding in the atmospheric distillation column".

(#3: Diagnosis)

Here, it is assumed that there is a plurality of operating states Y to be diagnosed. The operating states Y to be diagnosed may be the states obtained as a result of actual operation of the plant (actual data) or may be the states obtained as a result of the simulation by the device (simulation data). The device marks with points indicating the operating states Y to be diagnosed in the above-described space and specifies the category (sphere) including the points. When it is assumed that the operating states Y to be diagnosed are also a matrix having n rows×m columns, the category is specified for each of m timepoints.

(Specific Examples of Operating Conditions, Operating States, and Management Indices)

With reference to FIG. 3, specific examples of the operating conditions X, the operating states Y, and the management indices Z are described. The horizontal axis in FIG. 3 indicates timepoints. The timepoints become later in order from the left to the right of FIG. 3. The rows of the operating conditions X are the above-described items for the operating conditions X. In the cells at the intersections of the vertical axis and the horizontal axis, set values for the equipment and the like constituting the plant are stored. The set value of each cell is naturally different, but the set value is shown as " . . . " by being omitted in the drawing.

The rows of the operating states Y are the above-described items for the operating states Y. In the cells at the intersections of the vertical axis and the horizontal axis, measurement values measured by the sensors installed at the equipment, piping, and the like of the plant are stored. The measurement value of each cell is naturally different, but the measurement value is shown as " . . . " by being omitted in the drawing. The value of " . . . " in the drawing is the result of the simulation by the device based on " . . . " in the operating condition X as described above. In that sense, " . . . " in the operating state Y is a virtual value although it is described as the "measured value".

The rows in the management indices Z are the above-described items for the management indices Z. In the cells at the intersections of the vertical axis and the horizontal axis, values of monetary indices related to raw material procurement, product sales, finance, and the like. The value of each cell is naturally different, but the value is shown as " . . . " by being omitted in the drawing. The value of " . . . " in the drawing is a value calculated by the device based on the operating states Y and the unit prices P as described above.

With reference to FIG. 4, specific examples of the operating conditions X, maintenance M, the operating states Y, and the management indices Z are described. FIG. 4 differs from FIG. 3 in that the maintenance M is included in FIG. 4. The suffix "d" of "X", "Y", and "Z" means "it has been revised after the execution of maintenance" (to be described in detail later). The maintenance M is also a matrix, and the horizontal axis indicates timepoints. The vertical axis shows the specific maintenance for the plant. Then, in some of the cells at the intersections of the vertical axis and the horizontal axis, a character string of "execution" is stored. The "execution" indicates that maintenance is to be performed at that timepoint.

FIGS. 3 and 4 are referred to. The device detects the normality/abnormality of the plant based on the operating states Y in FIG. 3 and outputs the diagnosis result. At this time, it is assumed that the device has detected, for example, the category "abnormality 1" at the timepoint "t2" and the category "abnormality 2" at the timepoint "t4" (at the other timepoints, the category "normal ○" has been detected). The device has, in the auxiliary storage device 15, an "abnormality/maintenance correspondence table" (not shown) in which maintenance corresponding to an abnormality is stored in association with the category of the abnormality. The device searches the abnormality/maintenance correspondence table using "abnormality 1" as the search key, acquires the corresponding maintenance, searches the abnormality/maintenance correspondence table using "abnormality 2" as the search key, and acquires the corresponding maintenance. The maintenance acquired at this time is the maintenance M in FIG. 4.

The device corrects a part of the operating conditions X (FIG. 3) (related to the pre-flash column) in response to "execution" 71 (FIG. 4) of the maintenance M. That is, the device stores the estimated value after the maintenance. As a result, some values of operating conditions Xd (FIG. 4) after the timepoint t4 have been changed from " . . . " to "". Furthermore, the device corrects a part of the operating conditions X (FIG. 3) (related to the atmospheric distillation column) in response to "execution" 72 (FIG. 4) of the maintenance M. As a result, some values of the operating conditions Xd (FIG. 4) after the timepoint t2 have been changed from " . . . " to "".

Next, the device simulates operating states Yd based on the operating conditions Xd. In the operating states Yd (FIG. 4) which is the simulation results, some values have been changed from " . . . " to "##" or "♭♭" as compared with the operating states Y (FIG. 3).

Thereafter, the device calculates management indices Zd based on the operating states Yd and the unit prices P. As a result, the values of the management indices Zd (FIG. 4) after the timepoint t2 have been changed from " . . . " to "***" as compared with the management indices Z (FIG. 3).

(Manufacturing Facility Management Optimization Device)

Figure 5:
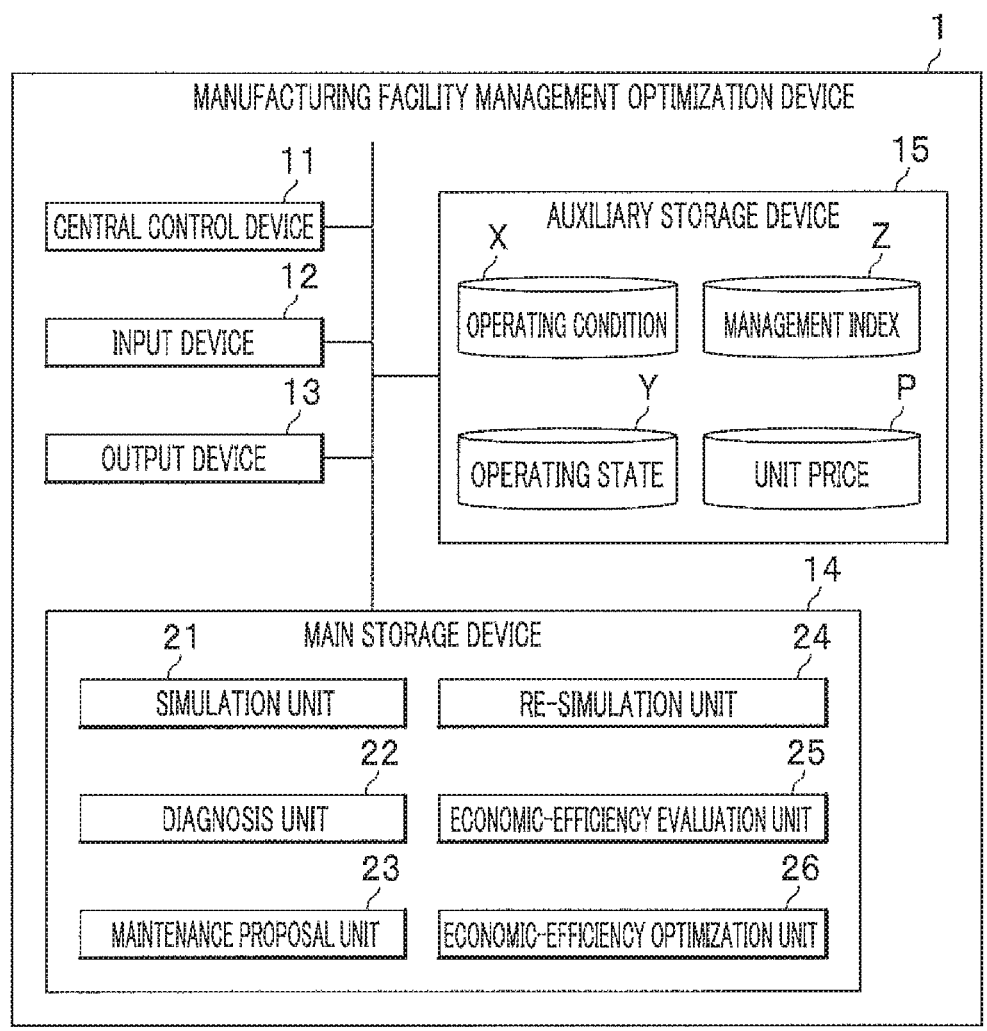
FIG. 5 is a diagram for explaining a configuration of a manufacturing facility management optimization device.

With reference to FIG. 5, a configuration of a manufacturing facility management optimization device 1 is described. The manufacturing facility management optimization device 1 is a general computer and includes a central control device 11, an input device 12 such as a keyboard, an output device 13 such as a display, a main storage device 14, and an auxiliary storage device 15. These devices are mutually connected by a bus. The auxiliary storage device 15 stores the operating conditions X, the operating states Y, the management indices Z, and the unit prices P. The main storage device 14 includes a simulation unit 21, a diagnosis unit 22, a maintenance proposal unit 23, a re-simulation unit 24, an economic-efficiency evaluation unit 25, and an economic-efficiency optimization unit 26 as programs. Hereinafter, when "oo unit" is described as the subject, this means that the central control device 11 reads each program from the auxiliary storage device 15, loads it in the main storage device 14, and implements the function of each program (to be described in detail later).

(Control Screen)

Figure 6:
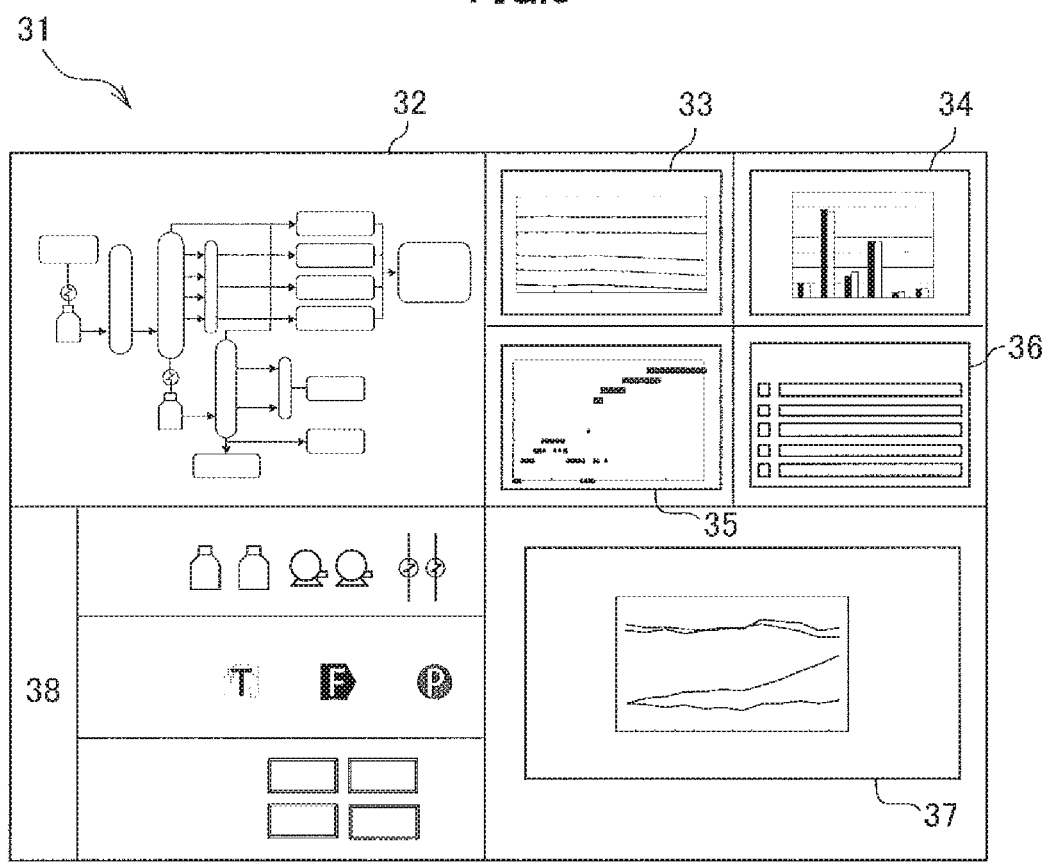
FIG. 6 is a diagram for explaining a control screen.

With reference to FIG. 6, a control screen is described. A control screen 31 is a screen displayed on the output device of the manufacturing facility management optimization device 1. A plant-configuration screen 32 of the control screen 31 schematically shows the configuration of the plant. A line-graph screen 33 shows data suitable for being expressed by a time-series line graph such as temperature values in the operating states Y. A bar-graph screen 34 shows data suitable for being expressed by a time-series bar graph such as the output quantity of the products in the operating states Y. A diagnosis screen 35 shows category transition (to be described in detail later). A maintenance screen 36 shows the detail of the maintenance M as character strings. An economic-efficiency screen 37 shows the management indices Z in a line graph. An icon/button field 38 is an area displaying graphics that are samples when the user draws the plant configuration, buttons that the user presses to operate the device, and the like.

(Processing Procedure)

Figure 7:
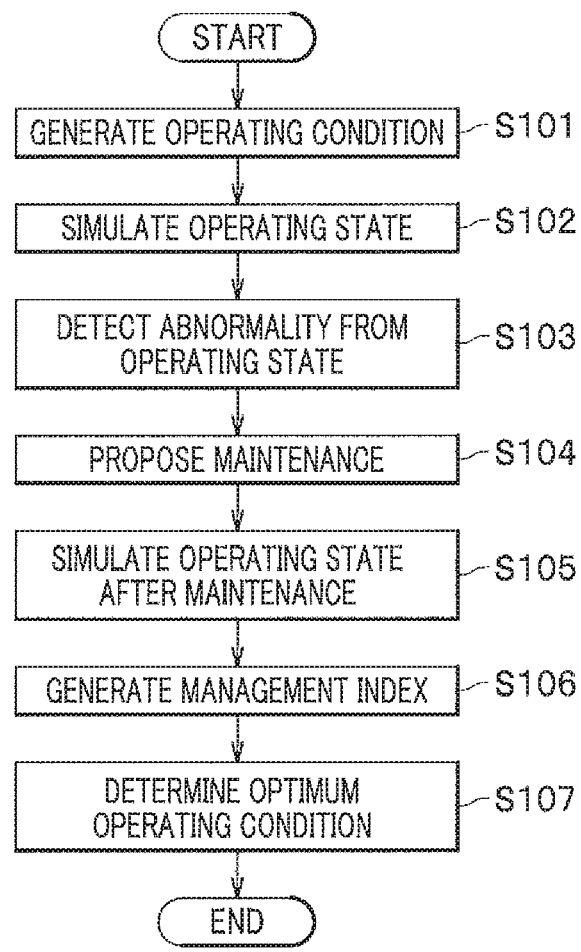
FIG. 7 is a flowchart of a processing procedure.

With reference to FIG. 7, a processing procedure is described. FIGS. 8 to 16 are described at appropriate timings.

In step S101, the simulation unit 21 generates an operating condition X. The simulation unit 21 generates an operating condition X by one of the following methods.

(1) The simulation unit 21 accepts an input of a matrix such as the operating condition X in FIG. 3 via the input device 12 by the user.

(2) The simulation unit 21 reads the past operating condition X from the auxiliary storage device 15. Note that, it is assumed that the past actual operating condition X is stored in the auxiliary storage device 15.

(3) The simulation unit 21 automatically generates a virtual operating condition X. At this time, the simulation unit 21 may generate all or a part of the values of the operating condition X based on random numbers generated randomly. Furthermore, the simulation unit 21 may generate a plurality of operating conditions X based on a predetermined scenario (an operation-time saving scenario, a raw-material saving scenario, a nighttime inclined operation scenario, a winter inclined operation scenario, or the like).

In step S102, the simulation unit 21 simulates an operating state Y. Specifically, as the first step, the simulation unit 21 generates an operating state Y based on the operating condition X generated in step S101.

Figure 8:
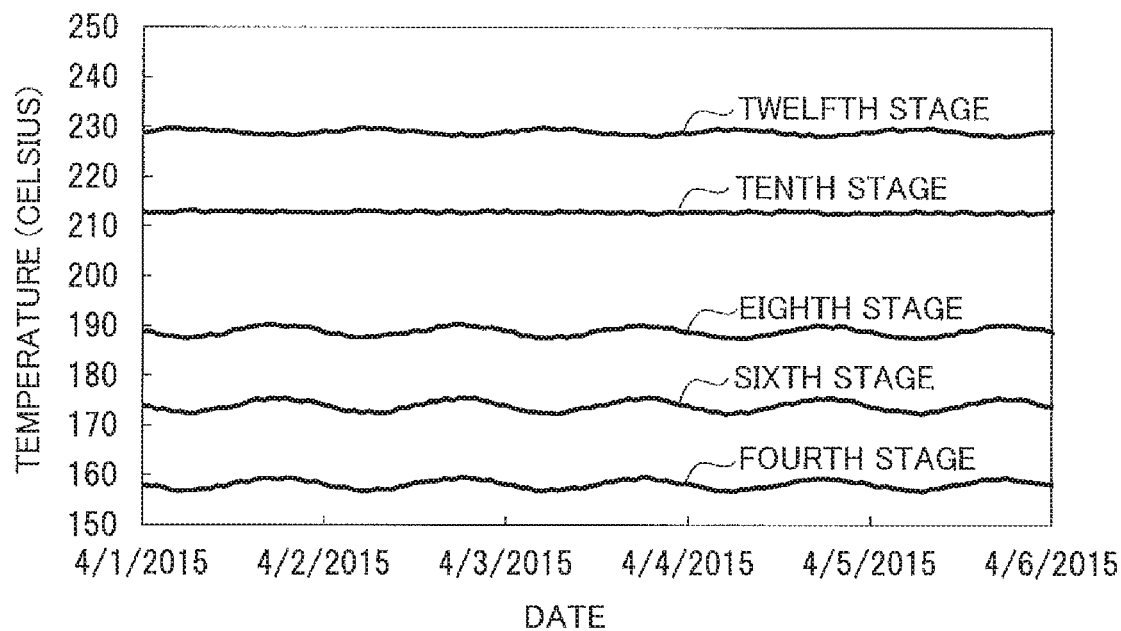
FIG. 8 is a line graph showing a part of an operating state.
Figure 9:
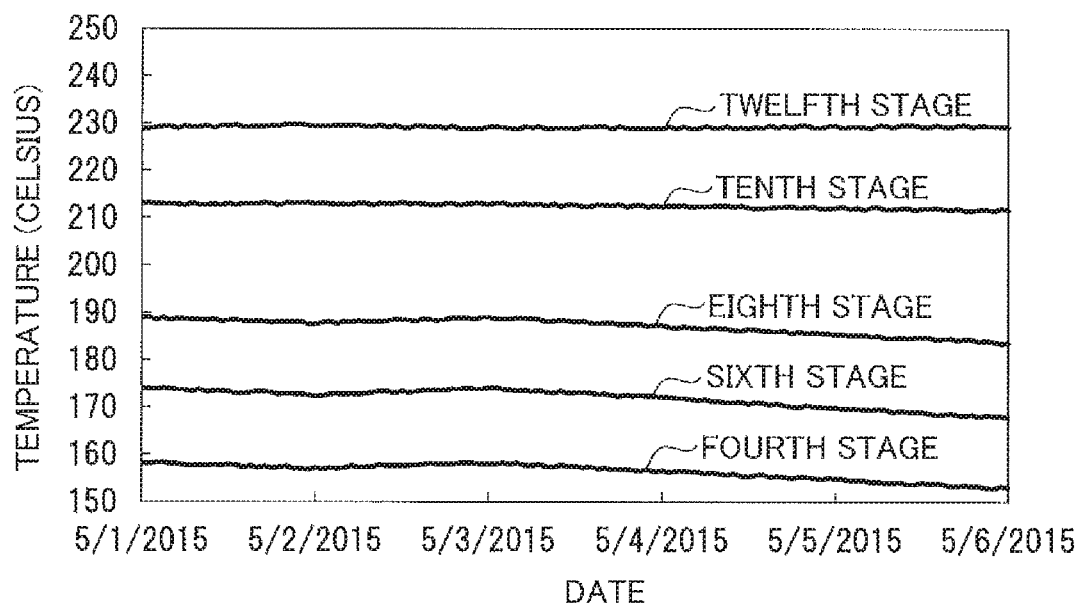
FIG. 9 is a line graph showing a part of an operating state.

As the second step, the simulation unit 21 displays the operating state Y, which is the result of the simulation, on the output device 13. At this time, the simulation unit 21 may display a matrix such as the operating state Y in FIG. 3, or a predetermined part of the operating state Y on the line-graph screen 33 of the control screen 31 as a line graph. FIGS. 8 and 9 show examples of the graph displayed at this time. The horizontal axes in FIGS. 8 and 9 indicate timepoints and the vertical axis shows the temperature of each stage of the atmospheric distillation column. Depending on the operating condition X generated in step S101, there are some cases in which the temperature of each stage of the atmospheric distillation column is stable or is stable as an average level while fluctuating in a certain cycle (FIG. 8), or the temperature of a certain stage of the atmospheric distillation column tends to decrease (FIG. 9).

In step S103, the diagnosis unit 22 detects an abnormality from the operating state Y. Specifically, as the first step, the diagnosis unit 22 marks with a point indicating the operating state Y, which is the result of the simulation in the first step in step S102, in the above-described n-dimensional space, and specifies the category (sphere) including the point at each timepoint. When the specified category is "abnormal o", this means that the diagnosis unit 22 detects an abnormality.

As the second step, the diagnosis unit 22 displays the specified category on the output device 13. At this time, the diagnosis unit 22 may display category transition as shown in FIGS. 10 and 11 on the diagnosis screen 35 of the control screen 31 as a graph.

Figure 10:
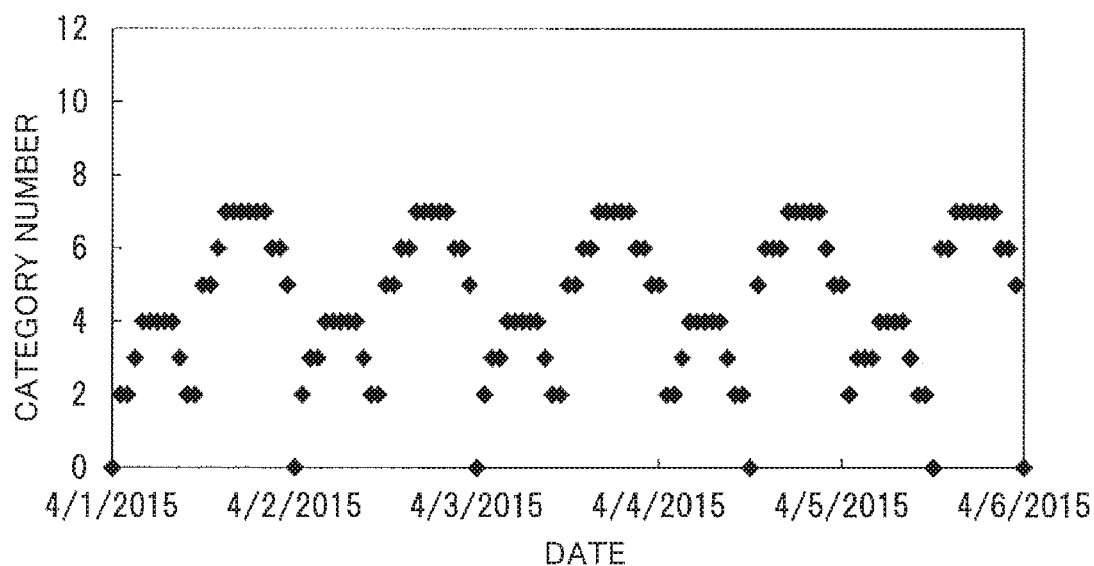
FIG. 10 is an example of category transition.
Figure 11:
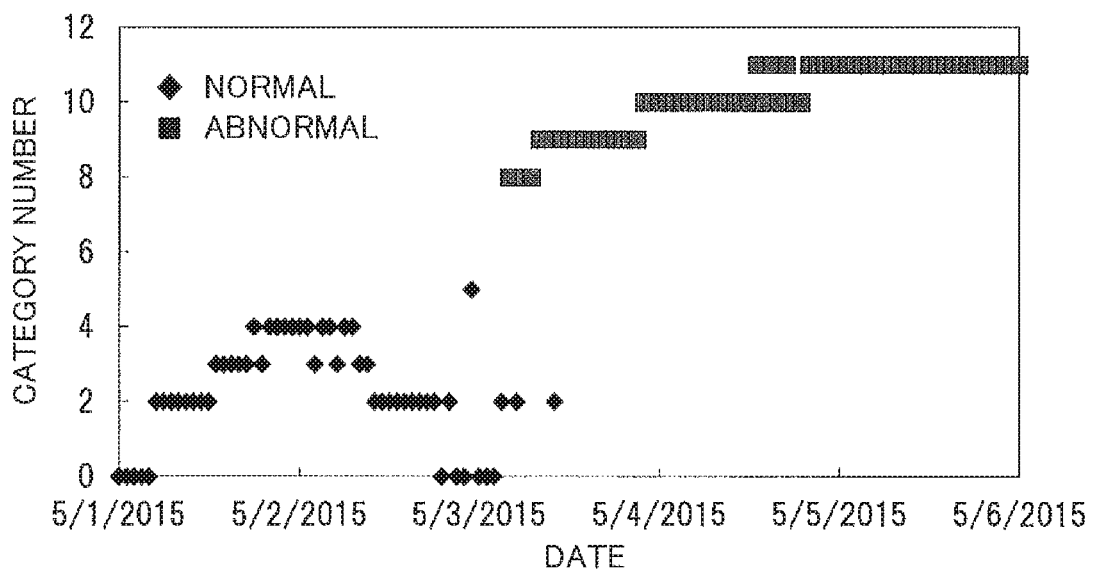
FIG. 11 is an example of category transition.

The horizontal axes in FIGS. 10 and 11 indicate timepoints, and "0", "1", . . . , "7" in the vertical axis are the category (sphere) numbers in the n-dimensional space, and indicate "normal 0", "normal 1", . . . , "normal 7" respectively. In the vertical axis, "8", "9", "10" and "11" indicate "abnormality 8", "abnormality 9", "abnormality 10", and "abnormality 11" respectively. The category transition in FIG. 10 corresponds to FIG. 8 and shows that the normal categories periodically appear. The category transition in FIG. 11 corresponds to FIG. 9, and shows that the normal categories initially appears, but the abnormal categories starts to appear thereafter, and no normal categories finally appear.

In step S104, the maintenance proposal unit 23 proposes maintenance. Specifically, as the first step, the maintenance proposal unit 23 searches the abnormality/maintenance correspondence table using the category "abnormality o" specified in the first step in step S103 as the search key and specifies the corresponding maintenance. Then, for example, maintenance such as the maintenance M in FIG. 4 is specified.

As the second step, the maintenance proposal unit 23 corrects the part of the operating condition X corresponding to the maintenance specified in the first step in step S104, and changes it to an operating condition Xd.

As the third step, the maintenance proposal unit 23 displays the maintenance M and the operating condition Xd on the output device 13. Since a plurality types of maintenance corresponds to one abnormality in the above-described abnormality/maintenance correspondence table, it is assumed that the maintenance proposal unit 23 generates and displays a plurality of candidates for the operating condition Xd.

In step S105, the re-simulation unit 24 simulates an operating state Yd after the maintenance is performed. Specifically, as the first step, the re-simulation unit 24 generates an operating state Yd based on the operating condition Xd generated in the second step in step S104. The re-simulation unit 24 is to generate a plurality of candidates for the operating state Yd.

As the second step, the re-simulation unit 24 displays the plurality of candidates for the simulated operating state Yd on the output device 13.

In step S106, the economic-efficiency evaluation unit 25 generates a management index Z. Specifically, as the first step, the economic-efficiency evaluation unit 25 generates a management index Z based on the operating state Y simulated in the first step in step S102 and the unit prices P.

As the second step, the economic-efficiency evaluation unit 25 generates a management index Zd based on the operating state Yd simulated in the first step in step S105 and the unit prices P. The economic-efficiency evaluation unit 25 is to generate a plurality of candidates for the management index Zd.

Figure 12A:
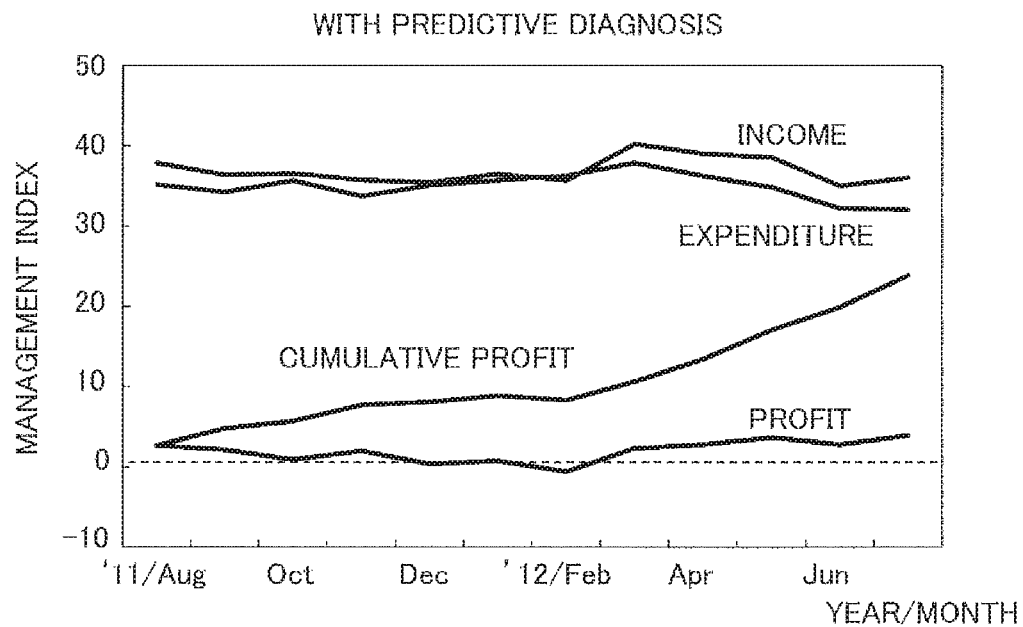
FIGS. 12A and 12B are management indices shown as line graphs.
Figure 12B:
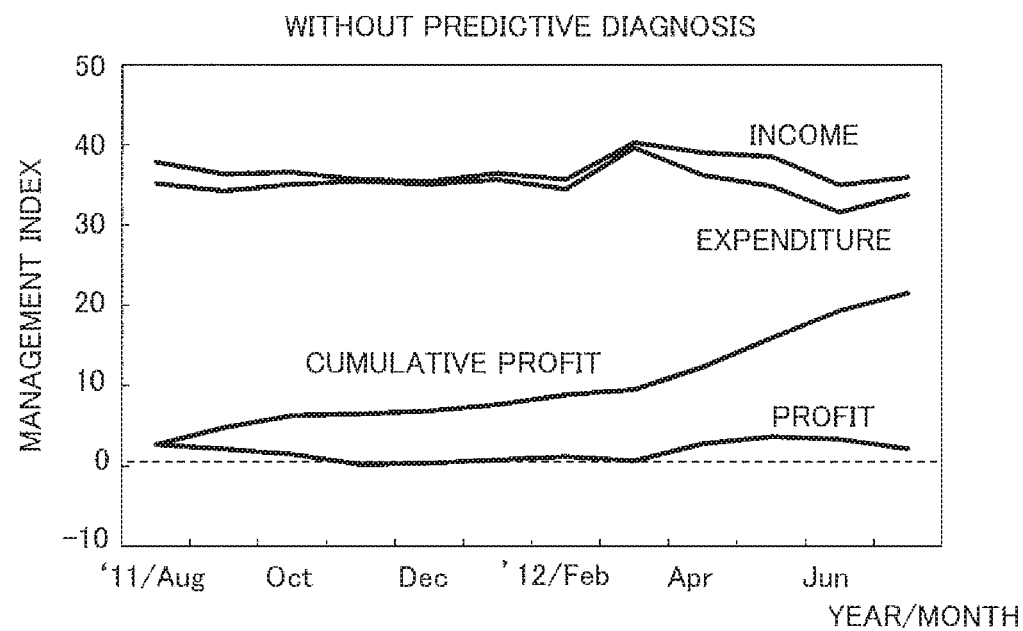
Figure 13:
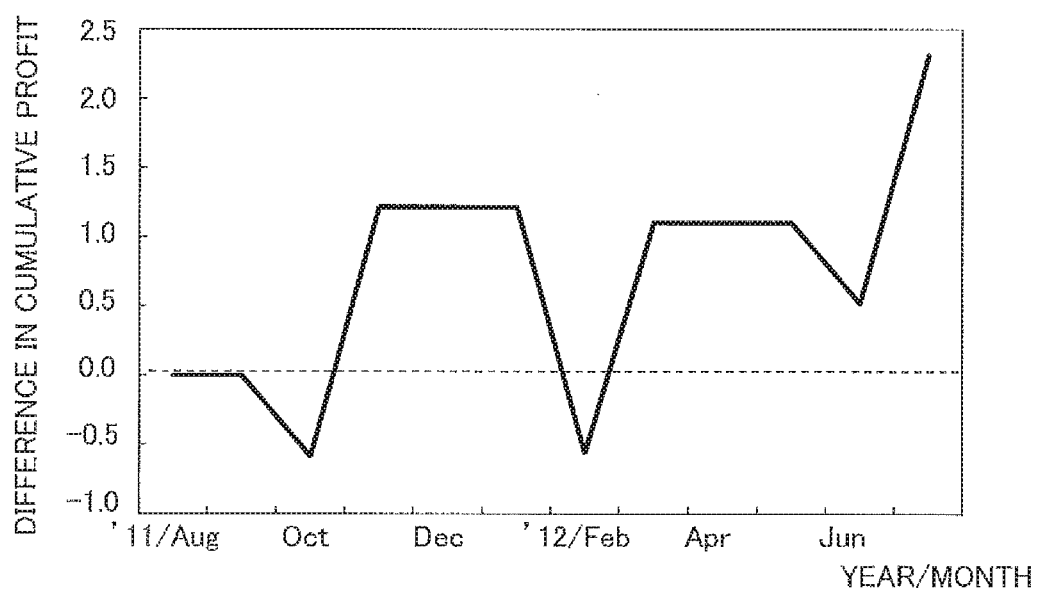
FIG. 13 is a line graph showing the difference between management indices.
Figure 14A:
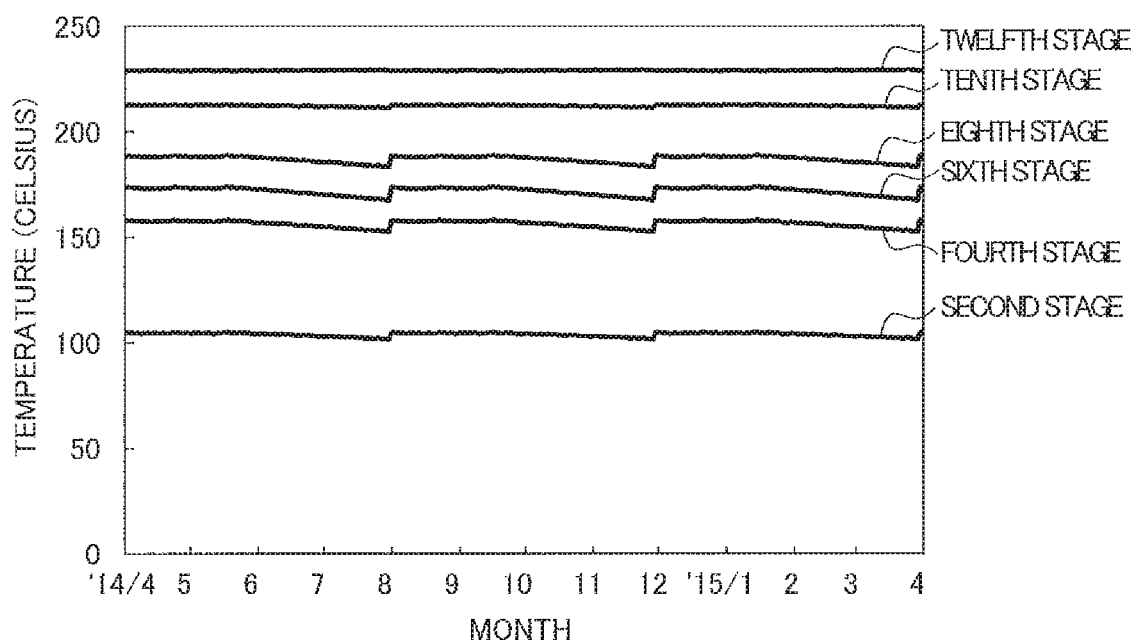
FIGS. 14A and 14B are examples of a part of an operating state when the operating state is not diagnosed.
Figure 14B:
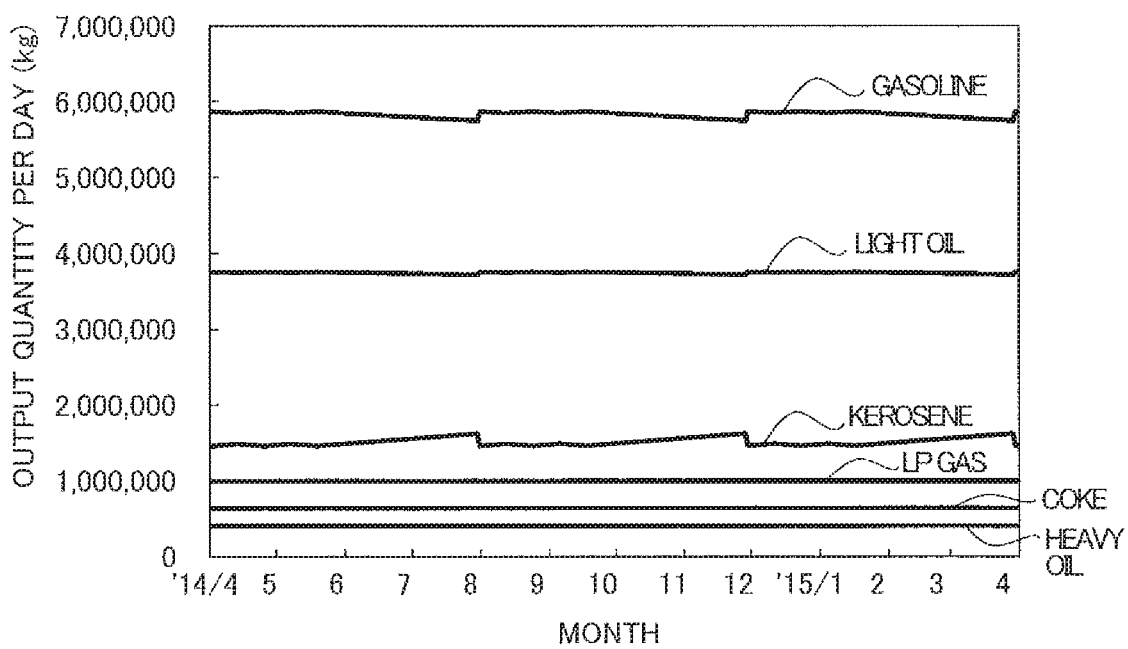

As the third step, the economic-efficiency evaluation unit 25 displays the management index Z generated in the first step in step S106 and the plurality of candidates for the management index Zd generated in the second step in step S106 on the output device 13 as the economic-efficiency screen 37 of the control screen 31. At this time, the economic-efficiency evaluation unit 25 displays the management index Z and the plurality of candidates for the management index Zd so as to be compared with each other. Furthermore, the economic-efficiency evaluation unit 25 may display the operating condition X which is the basis of the management index Z and the plurality of candidates for the operating condition Xd which is the basis of the plurality of candidates for the management index Zd so as to be compared with each other. The economic-efficiency evaluation unit 25 may display the management index Zd as a graph as shown in FIG. 12(a), or may display the management index Z as a graph as shown in FIG. 12(b). Furthermore, the economic-efficiency evaluation unit may display the difference obtained by subtracting the management index Z from the management index Zd for each management-index item as a graph. FIG. 13 is an example showing the difference on the cumulative profit as a graph.

In step S107, the economic-efficiency optimization unit determines the optimum operating condition Xd. Specifically, as the first step, the economic-efficiency optimization unit 26 accepts that the user designates an item from the management-index items. Here, it is assumed that the user designates "cumulative profit".

As the second step, the economic-efficiency optimization unit 26 specifies, from the plurality of candidates for the operating state Yd simulated in the first step in step S105, the operating state Yd in which "cumulative benefit" at a certain timepoint is maximum.

As the third step, the economic-efficiency optimization unit 26 specifies the operating condition Xd which is the basis of the operating state Yd specified in the second step in step S107, and displays it on the output device 13.

As a matter of course, the user can designate, from the management-index items, an item that is preferable to have a smaller value (for example, "expenditure") in the first step in step S107. In this case, the economic-efficiency optimization unit 26 specifies, in the second step in step S107, the operating state Yd in which "expenditure" at a certain timepoint is minimum. Furthermore, the cumulative profit or the like is not limited to "maximum" or "minimum", but may be "more than 90% of the maximum," or "within the o-th from the maximum". In addition, the cumulative profit or the like is not necessarily to be "large" or "small", and may belong to a range having some meaning in terms of management.

Thereafter, the processing procedure is terminated.

(Modification of Processing Procedure)

Here, an item (line) of the operating condition X is represented as $x_i$. Then, an item (line) of the management index Z is represented as $z_i$. It is assumed that the most important $z_i$ in management is "income". Then, it is assumed that the user desires to know what $x_i$ having the highest degree of influence on "income" represents (for example, "introduction quantity of crude oil").

As described above, the relationship "Z=F (X, P)" is established. That is, it is possible to specify $x_i$ that makes the partial differential coefficient "$\delta z_i / \delta x_i$" at a certain timepoint large enough to satisfy a predetermined criterion as a "bottleneck item". Naturally, it is also possible to specify $x_i$ that makes the increase/decrease of $z_i$ in a certain period large enough to satisfy a predetermined criterion as a "bottleneck item".

Thus, by using many of the past operating conditions X as samples, the simulation unit 21 simulates the operating state Y corresponding to each sample. The economic-efficiency evaluation unit 25 generates a management index Z for each operating state Y which is the simulation result. The economic-efficiency optimization unit 26 accepts an input of an item "$z_i$" on which the user particularly focuses. Thereafter, the economic-efficiency optimization unit 26 specifies the bottleneck item $x_i$ as described above. Then, the maintenance proposal unit 23 proposes only the maintenance M that changes the value of $x_i$ (bottleneck item).

(Verification)

It is important for the diagnosis unit 22 to diagnose the operating state Y. If the diagnosis unit 22 is not provided and an abnormality cannot be detected from the operating state Y, the operating state Y is to be shown as in, for example, FIGS. 14(a) and 14(b). The temperatures of the second stage, the fourth stage, the sixth stage, and the eighth stage of the atmospheric distillation column 58 decrease, and the output quantities of gasoline and light oil are reduced. On the other hand, the output quantity of kerosene is increased. Then, a maintenance worker has to perform some kind of maintenance every time the maintenance worker notices a decrease in temperature (once every four months in the drawing).

Figure 15:
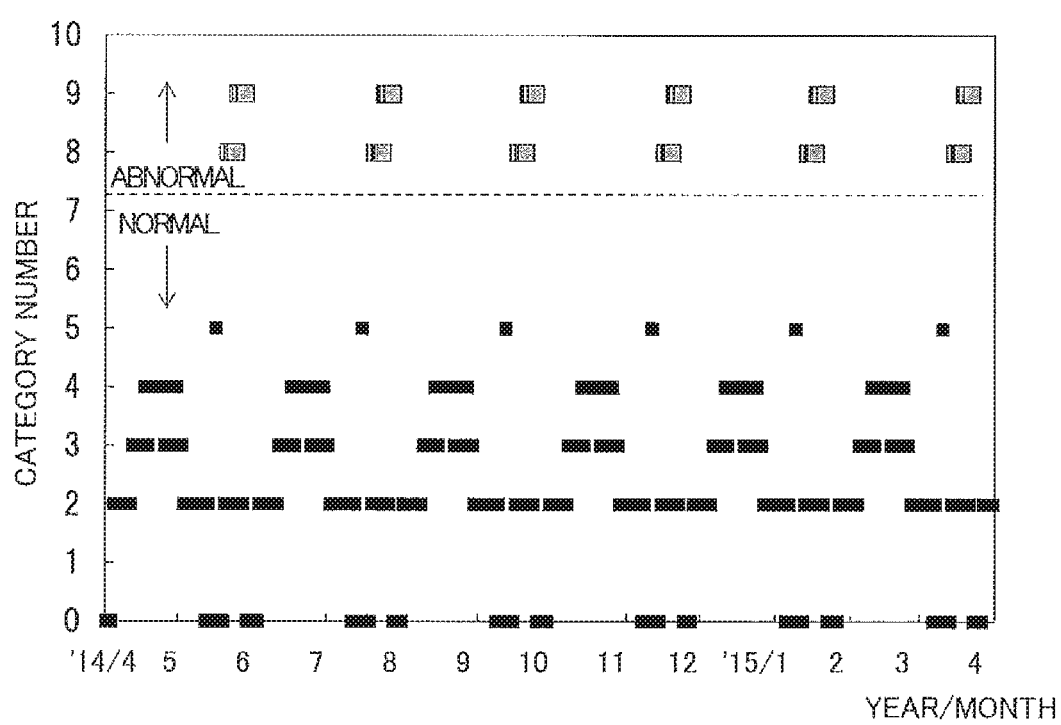
FIG. 15 is an example of category transition when an operating state is diagnosed.
Figure 16A:
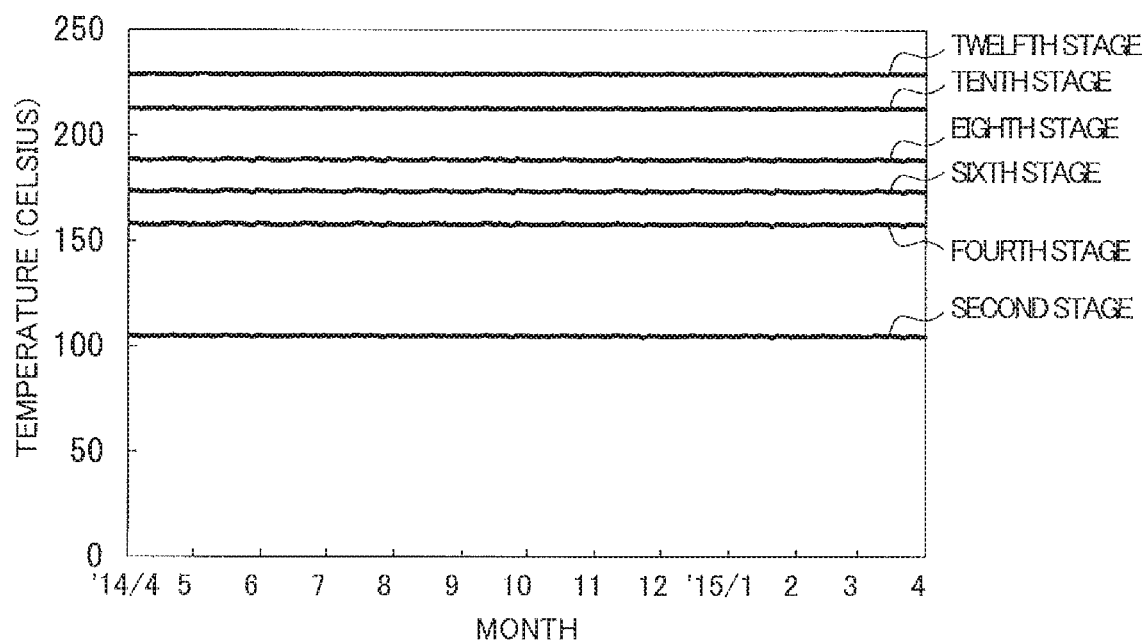
FIGS. 16A and 16B are examples of a part of an operating state when the operating state is diagnosed.
Figure 16B:
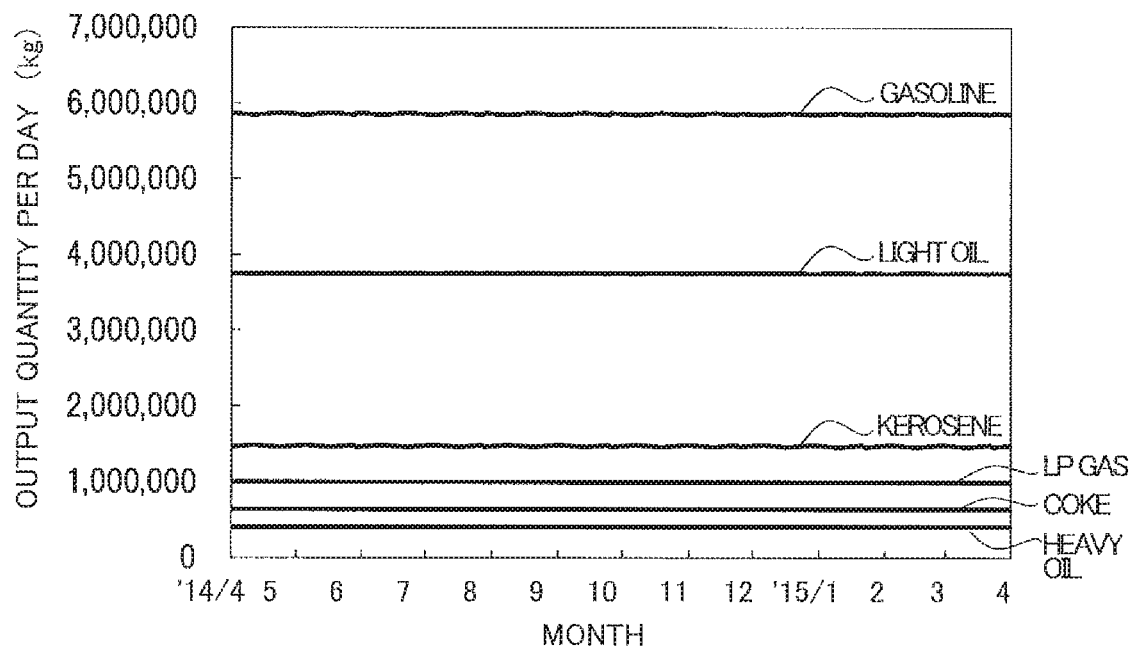

When the diagnosis unit 22 diagnoses the operating state Y, the category transition which is the diagnosis result is shown as in, for example, FIG. 15. The diagnosis unit 22 detects abnormalities every two months. The maintenance proposal unit 23 naturally proposes some kind of maintenance M. The maintenance worker then performs the proposed maintenance M preventively. The operating state Yd after the preventive maintenance is performed in this manner is shown as in, for example, FIGS. 16(a) and 16(b). The temperatures of the second stage, the fourth stage, the sixth stage, and the eighth stage are stable, and the output quantities of gasoline, light oil, and kerosene are also stable.

Note that, FIG. 12(b) described above corresponds to a case in which the diagnosis unit 22 is not provided, and FIG. 12(a) corresponds to a case in which the diagnosis unit 22 diagnoses the operating state Y. It can be seen that the cumulative profit in FIG. 12(a) turns slightly upward as compared with the cumulative profit in FIG. 12(b).

Effects of Embodiment

The manufacturing facility management optimization device of the present embodiment has the following effects.

(1) It is possible for the user to find an operating condition having a high economic efficiency, in which a normal operating state is guaranteed, together with necessary maintenance.

(2) It is possible to reduce the burden on the user since an operating condition for simulating an operating state is automatically generated.

(3) It is possible for the user to perform simulation using only important items (for example, a bottleneck item) among many operating conditions.

(4) It is possible for the user to easily compare the management index after maintenance with the management index without maintenance.

(5) It is possible for the user to apply the manufacturing facility management optimization device particularly to a large-scale petroleum refining plant and the like.

Furthermore, the present invention is not limited to the above embodiment and includes various modifications. For example, the above embodiment has been described in detail in order for the present invention to be easily understood, and is not necessarily limited to those having all the described configurations. Furthermore, a part of the configuration of an embodiment can be replaced with the configuration of another embodiment, and the configuration of an embodiment can be added to the configuration of another embodiment. Moreover, other configurations can be added, deleted, or replaced with respect to a part of the configuration of each embodiment.

In addition, the above configurations, functions, processing units, processing means, and the like may be implemented by hardware by, for example, designing a part or all of them in an integrated circuit. Alternatively, the above configurations, functions, and the like may be implemented by software by interpreting and executing programs for implementing each function by a processor. Information, such as programs, tables, and files, that implements the functions can be stored in a storage device such as a memory, a hard disk, a solid-state drive (SSD), or a recording medium such as an IC card, an SD card, or a DVD.

Note that, control lines and information lines considered to be necessary for the description are shown, and all control lines and information lines are necessarily shown on products. In practice, it can be considered that almost all the configurations are mutually connected.

REFERENCE SIGNS LIST 1 manufacturing facility management optimization device
11 central control device
12 input device
13 output device
14 main storage device (storage unit)
15 auxiliary storage device (storage unit)
21 simulation unit
22 diagnosis unit
23 maintenance proposal unit
24 re-simulation unit
25 economic-efficiency evaluation unit
26 economic-efficiency optimization unit
P unit price
X operating condition
Y operating state
Z management index

The invention claimed is:

1. A manufacturing facility management optimization device comprising:
   a storage unit configured to store unit prices of a product manufactured by a manufacturing facility and a raw material consumed by the manufacturing facility;
   a simulation unit configured to simulatively generate an operating state based on an operating condition of the manufacturing facility, the operating state including a measurement value of the manufacturing facility, an output quantity of the product, and a consumption amount of the raw material in time series;
   a diagnosis unit configured to detect an abnormality from the generated operating state, by specifying to which one of a plurality of categories the generated operating state belongs, the categories indicating respective abnormalities different from each other in the operating states of the manufacturing facility;
   a maintenance proposal unit configured to search an abnormality/maintenance correspondence table in which maintenance corresponding to the abnormality is stored in association with the category of the abnormality, specify maintenance corresponding to the detected abnormality, correct the operating condition based on the specified maintenance, and generate a plurality of candidates for the corrected operating condition;
   a re-simulation unit configured to simulatively generate, based on the plurality of candidates for the corrected operating condition, a plurality of candidates for the corrected operating state including the measurement value of the manufacturing facility, the output quantity of the product, and the consumption amount of the raw material in time series;
   an economic-efficiency evaluation unit configured to generate a management index for each of the operating state and the plurality of candidates for the corrected operating state based on the output quantity of the product and the consumption amount of the raw material in the operating state, the output quantity of the product and the consumption amount of the raw material in the plurality of candidates for the corrected operating state, and the unit prices; and an economic-efficiency optimization unit configured to specify a candidate that optimizes the management index from the plurality of candidates for the corrected operating condition.

2. The manufacturing facility management optimization device according to claim 1, wherein before generating the operating state based on the operating condition, the simulation unit generates the operating condition based on past results or generates a virtual operating condition.

3. The manufacturing facility management optimization device according to claim 2, wherein
the economic-efficiency optimization unit specifies, from items constituting the operating condition, an item having an influence, on the management index, that is large enough to satisfy a predetermined criterion, and
the maintenance proposal unit revises the operating condition for the specified item.

4. The manufacturing facility management optimization device according to claim 3, wherein the economic-efficiency evaluation unit displays the operating condition and the plurality of candidates for the corrected operating condition so as to be compared with each other, and displays the management index based on the operating condition and the management index based on the plurality of candidates for the corrected operating condition so as to be compared with each other.

5. The manufacturing facility management optimization device according to claim 4, wherein the manufacturing facility is any one of a petroleum refining plant, a chemical plant, an electric power plant, a water treatment plant, and a pharmaceutical manufacturing plant.

* * * * *